United States Patent

Brezinski et al.

[11] 4,118,781
[45] Oct. 3, 1978

[54] VALLEY SENSOR FOR AN ELECTROPHORETIC ANALYZER

[75] Inventors: Donald P. Brezinski, Corning, N.Y.; William E. Powell, Raleigh, N.C.

[73] Assignee: Corning Glass Works, Corning, N.Y.

[21] Appl. No.: 800,005

[22] Filed: May 24, 1977

[51] Int. Cl.² ............................................. G01D 9/28
[52] U.S. Cl. ..................................... 364/525; 346/13; 356/202
[58] Field of Search .................. 235/151.35, 182, 183; 346/13; 356/201, 202; 307/229; 364/525

[56] References Cited

U.S. PATENT DOCUMENTS

| | | | |
|---|---|---|---|
| 3,452,218 | 6/1969 | Kedson et al. | 235/183 |
| 3,706,877 | 12/1972 | Clifford, Jr. et al. | 235/151.35 |
| 3,750,187 | 7/1973 | Keefer | 235/183 X |
| 4,005,434 | 1/1977 | Golias et al. | 235/151.35 X |

*Primary Examiner*—Edward J. Wise
*Attorney, Agent, or Firm*—Walter S. Zebrowski; Clarence R. Patty, Jr.; Richard E. Kurtz

[57] ABSTRACT

An analyzer for electrophoretic samples includes a sensor of extremities, more particularly valleys, in the output from the detector. The analysis of electrophoretic samples includes integration of the area under each of the fractions of the multicomponent output. In order to integrate each of the components, it is necessary to detect valleys in the output. The detector output is first applied to a non-linear processor such as a logarithmic amplifier and a differentiator. The logarithmic amplifier changes the shape of the output to make the detection less dependent upon relative component amplitude. A threshold comparator produces a pulse when the slope of the analyzer output, as represented by the output of the differentiator, exceeds a threshold. The threshold is changed after the detection of the first valley. Noise suppression circuitry prevents the detector from responding to closely occurring extremities in the analyzer output.

6 Claims, 7 Drawing Figures

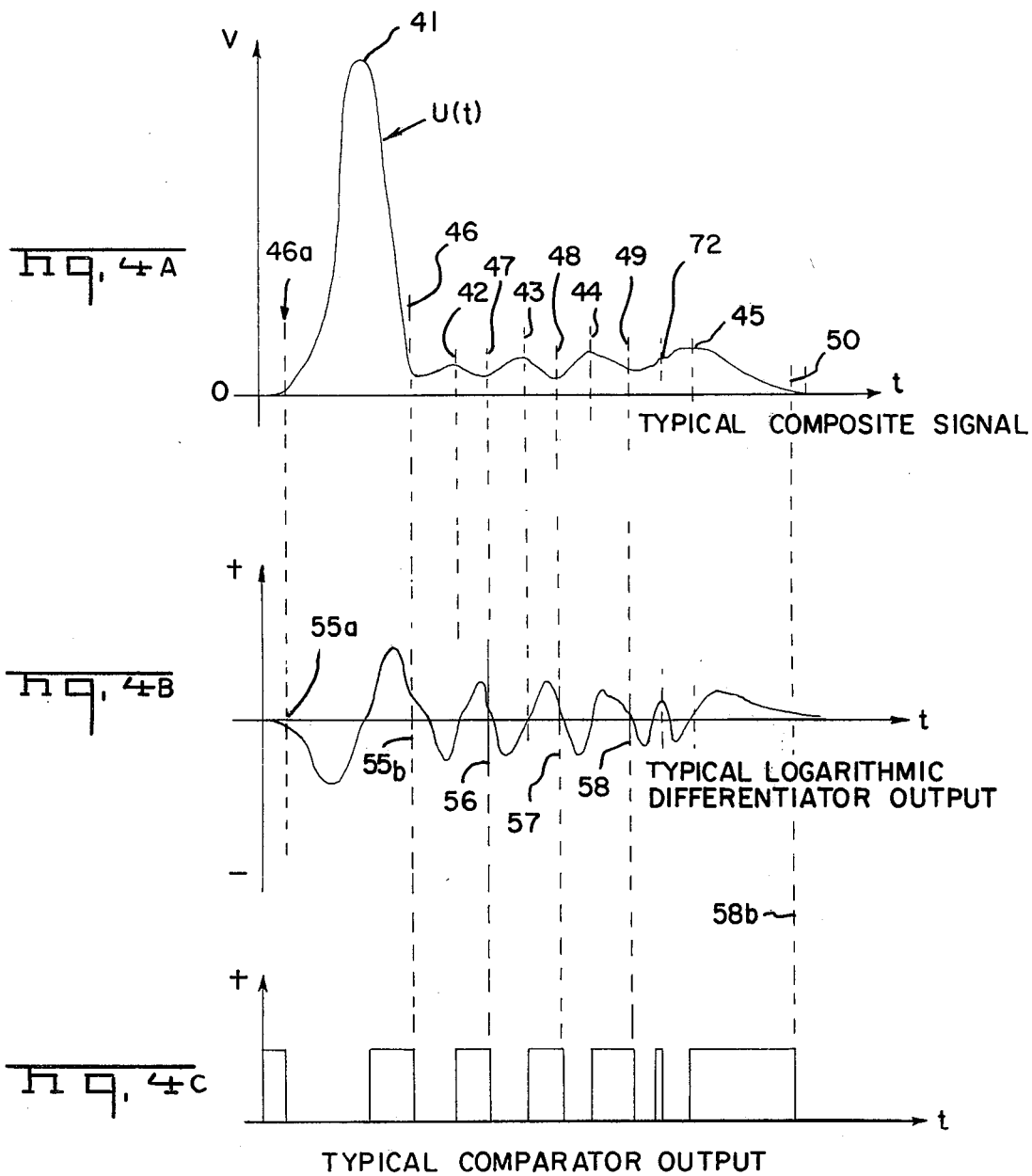

VALLEY SENSOR FOR AN ELECTROPHORETIC ANALYZER

BACKGROUND OF THE INVENTION

This invention relates to an automatic recording fluorometer/densitometer, and more particularly to an automatic valley sensor for such an instrument.

A recording fluorometer/densitometer is used to analyze the electrophoretic characteristics of a clinical sample.

U.S. Pat. Nos. 3,479,265 and 3,635,808 disclose thin film agarose sample plates which can be used as the electrophoretic medium. The thin film samples of these patents are particularly convenient for handling and storage.

These samples are analyzed by fluorometric or densitometric optical detection. One instrument for automatically making analyses of this type is described in U.S. Pat. No. 3,706,877. In such an instrument, the area under selected peaks of the curve is determined by integration. In order to perform the integration under selected peaks it is necessary to select the valleys between peaks so that the valleys can be used to define the limits of integration.

Automatic valley selection can be based upon the discrimination of certain characteristics of slope and curvature extant at desired valley points. Slope and curvature information can be derived from the first and higher derivatives of the signal. A problem with current use of derivative information is that the magnitude of electronic time-delay effects, the magnitude of sample-derived noise, and the values of curvature and slope near the extrema of a multicomponent profile are largely proportional to the magnitude of the components; hence, fixed values of slope and curvature cannot be used as reliable, shape-sensitive criteria for valley selection if the component peaks are not relatively uniform in size. For example, electrophoresis profiles are often composed of a number of peaks that are rather similar in shape, but quite different in amplitude. This makes it impossible to select shape equivalent integration limits for the peaks on the basis of fixed values for the first and higher derivatives, because all of these derivatives are proportional to the scale height of the peaks.

RELATED APPLICATIONS

Application Ser. No. 800,004, AUTOMATIC RECORDING FLUOROMETER/DENSITOMETER, Adrion et al shows the detection optics for the analyzer of the present invention, and application Ser. No. 799,942, RECORDING ANALYZER FOR ELECTROPHORETIC SAMPLES, Amos et al shows the scan and recording mechanism of the analyzer of this invention. The disclosures of those applications are incorporated herein by reference.

SUMMARY OF THE INVENTION

In accordance with this invention an analyzer for electrophoretic samples has an extremity sensor which accurately marks extremities, for example valleys, in the analysis output regardless of the amplitude of the output.

In accordance with the invention the output of the analysis energy detector is applied to a nonlinear processor such as a logarithmic differentiator which produces a signal having a magnitude which is sensitive to the shape of the output but substantially independent of the magnitude of the output. The output of the logarithmic differentiator is applied to a threshold comparator which detects when the output of the differentiator exceeds a threshold. When the slope is near zero, a valley is indicated. This threshold is changed after the detection of the first valley. The signal from the threshold comparator is applied to pulse shaping circuits which produce pulses marking the valleys in the detector output.

In order to prevent detection of closely occurring valleys caused by noise, a noise lockout circuit is provided. This includes a retriggerable multivibrator which inhibits the production of a valley pulse for a period of time after the detection of each peak that occurs before a valley.

The foregoing and other objects, features and advantages of the invention will be better understood from the following more detailed description and appended claims.

DESCRIPTION OF THE DRAWINGS

FIG. 3 is a block diagram of the automatic valley detector of this invention;

FIGS. 4a-4c are wave forms depicting the operation of the valley detector; and

DESCRIPTION OF THE PREFERRED EMBODIMENT

Figure 1:
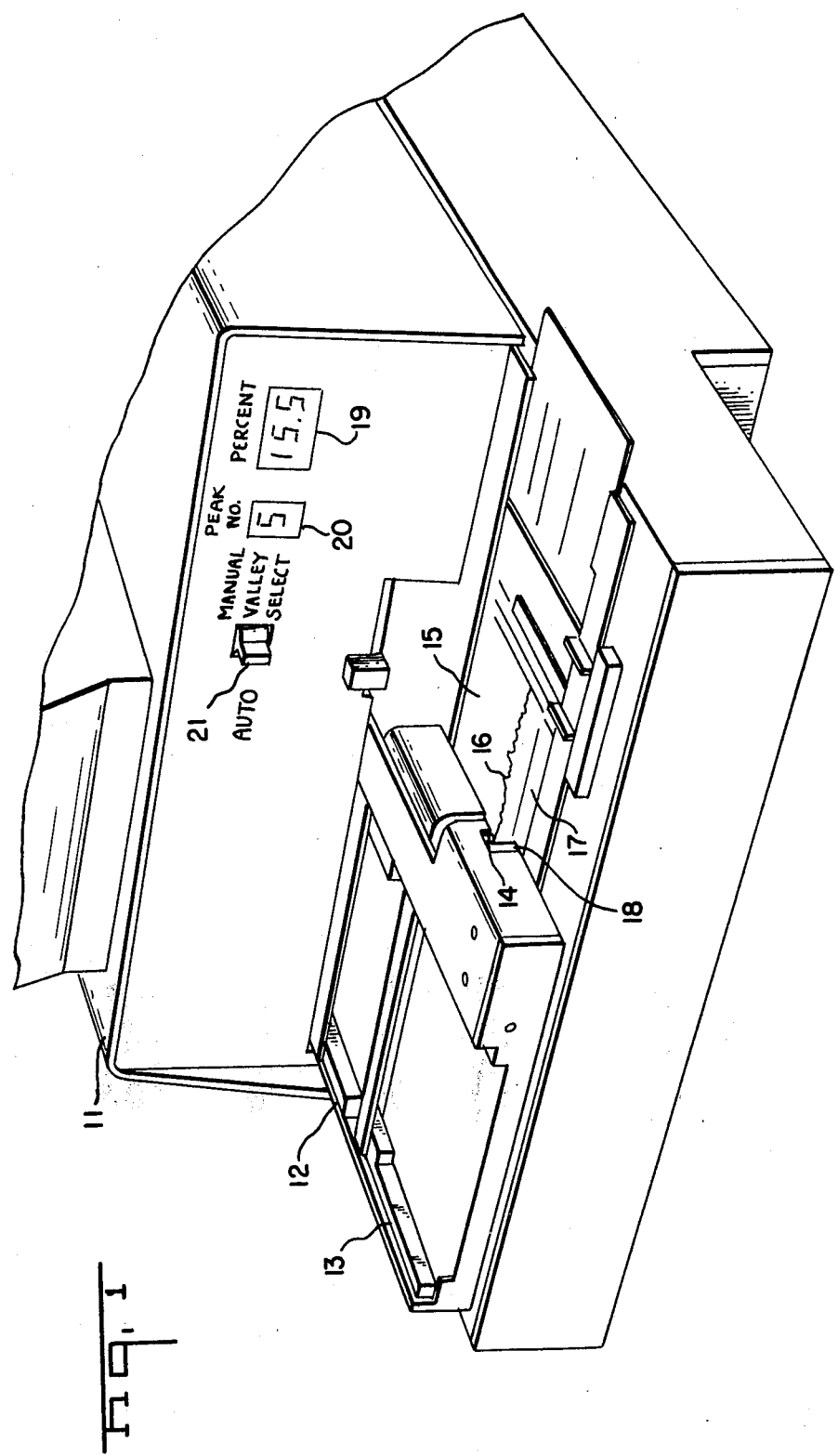
FIG. 1 shows the analyzer of this invention.

The instrument of this invention includes a case 11 which encloses fluorometric and densitometric sources of analysis energy and optics. For automatic recording, the film sample is inserted in the sample holder 12. The sample holder slides into the case between the light sources and the detection optics. The sample stage 13 moves in a horizontal direction to scan the analysis energy across the film. Concurrently, a recording pen 14 moves across the chart 15. A detector measures analysis energy intensity from the sample, and the recording system responds to the output of the detector to move the recording pen 14 orthogonally to the scanning motion. This records the intensity of fluorescence or light absorption of the sample.

The pen 14 is moved along chart 15 by the same movement which scans the sample across the light source and optics. This produces a record 16 of optical characteristics across the sample. The record has the same length as the length of the track on the sample which is scanned.

A record is produced by a forward, left to right, scan and a return, right to left, scan. On the forward scan, automatic circuits are conditioned to store the maximum and minimum of the detected analysis energy. On the return scan, the record 16 is drawn on the chart 15 and valleys between peaks are automatically selected. An integrator integrates the area of each peak under the record 16. The area of each peak as the percentage of the total area under the record 16 is determined. These percentages are displayed on digital display 19. Digital display 20 displays the number of the peak.

Figure 2:
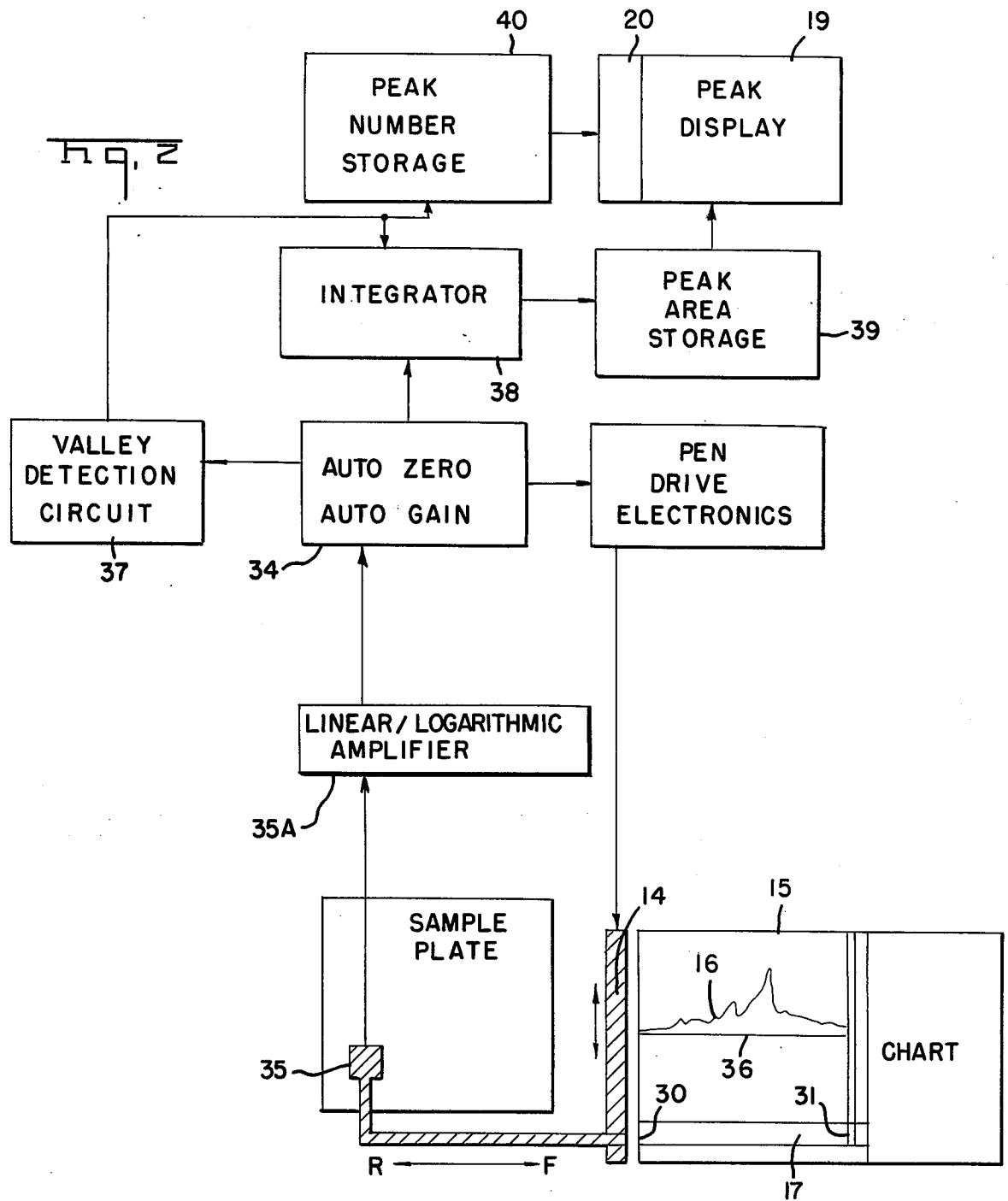
FIG. 2 is an electrical block diagram of the analyzer.
Figure 7:
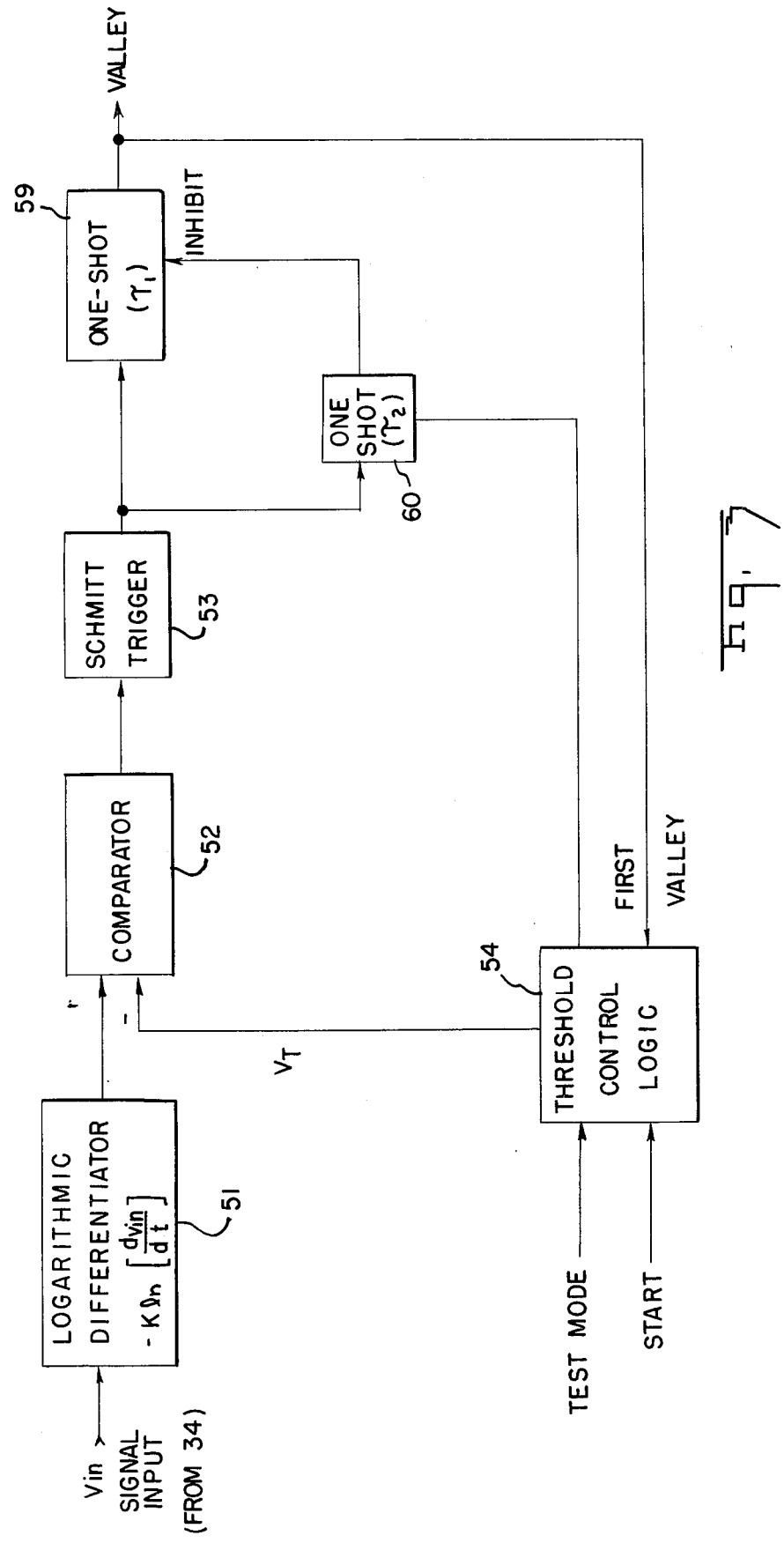

FIG. 2 shows an electrical block diagram of the analyzer. On the forward scan, circuit 34 stores the maximum and minimum in the output of detector 35 which has been processed by amplifier 35A. Linear/logarithmic amplifier 35A includes a logarithmic amplifier which is operative in the densitometric mode and a linear amplifier which is operative in the fluorometric mode. The recorder 14 draws a base line 36 on this forward scan. At the end of the forward scan, the minimum output of amplifier 35A from the forward scan is used to determine the data level zero and the maximum is used to set the gain of the amplifier in circuit 34 so that the pen of recorder 14 has a fixed displacement from zero for this signal.

On the return scan, the valley detection circuit 37 automatically selects integration limits (valleys) for the data peaks. An integrator 38 is enabled between valley marks to store the area under the different peaks in the record 16. The area under all peaks is summed and individual areas are normalized. The area of each peak is displayed as a percentage of the total area. While different types of integrators are suitable for use, one particularly suitable for use includes a digital pulse counter. A voltage to frequency converter in integrator 38 converts the output of circuit 34 into a pulse train, the frequency of which is proportional to the amplitude of the record 16. These pulses are counted between valley points. The counts between valley points are divided by the total count to obtain an expression of the area of each peak as a percentage of the total area. These percentages are stored in storage 39, and the number of the corresponding peak is stored in storage 40. These are displayed on the digital displays 19 and 20, respectively.

The output of the circuit 34, as recorded on the chart 15, is depicted in FIG. 4A. It is desirable to automatically separate the fractions 41-45 from the total signal so that each may be evaluated in relation to the whole. The circuit of this invention generates an electrical signal indicating where the valleys 46a, 46-50 between these fractions lie.

One way to find the separation point between the fractions is to obtain the time derivative of the signal and detect zero crossings of this derivative. Each peak and each valley produces a zero crossing of the differentiator. Since most differentiators are inverting, that is, $V_{OUT} = -K\, d(V_{IN})/dt$ then an upward rising input signal would produce a negative differentiator output.

As shown in FIG. 4A, the slopes on the component 41 are much larger than on the other components. It is necessary to reduce this slope difference to obtain accurate marking of very small valleys which are characterized by very gradual slopes. In accordance with this invention, the differentiated signal is amplified logarithmically so that the more gradual slopes are accentuated and the very steep slopes are compressed.

As shown in FIG. 3, the output of circuit 34, representing the optical properties of the sample, is applied to a logarithmic differentiator 51 which applies a higher gain for signals having more gradual slopes. To reduce unwanted noise, the maximum gain for small slopes is limited to a fixed value.

The logarithmically differentiated signal is applied to a threshold comparator 52 which, together with Schmitt trigger 53, forms logic compatible signals. Threshold comparator 52 compares the logarithmically differentiated signal to a threshold voltage $V_T$ which is usually slightly positive for optimum valley detection. The threshold voltage is first set to a value that will detect the first rising transition of the input signal above a certain slope. After this first valley is detected, the threshold voltage is changed to a more optimum value, usually a voltage corresponding to a very slight downward slope. Threshold control logic 54 changes the threshold voltage after the first detected valley. If the circuit is to be used in more than one type of analysis, the circuit performance may be optimized by changing the threshold voltage for each analysis, with appropriate circuitry.

A typical logarithmically differentiated signal is shown in FIG. 4B and the output of the threshold comparator is shown in FIG. 4C. Note that the threshold comparator switches at the time 55a marking the first valley. Subsequent valleys are marked at the times 55b, 56-58 and 58b which occur when the detector output slope is slightly negative.

Referring again to FIG. 3, the signal from the Schmitt trigger 53 is applied to a one shot multivibrator 59 and to a retriggerable multivibrator 60. The retriggerable multivibrator 60 produces an inhibit pulse in response to pulses from the Schmitt trigger 53. One shot multivibrator 59 produces pulses representing valley points. However, valley pulses are inhibited for a time $\tau_2$ after the last signal maxima occurs. Multivibrator 60 is retriggerable so that its output will go high at the first maxima and stay high for a time $\tau_2$ after the last maxima. The output of multivibrator 60 inhibits one shot multivibrator 59 from producing a valley pulse during the period $\tau$. This functions as a noise lockout in that it will not let the circuit select valleys closer together than $\tau_2$. If the logarithmic derivative of the signal reverses itself very quickly, as it would when signal noise was present, an unwanted valley would be suppressed.

As an example of the operation of the noise lockout circuit, consider the valley 72 in FIG. 4A. This valley is caused by the specimen applications "well" in the sample. However, it will not be detected as a valley by the circuits of the present invention because of the noise lockout feature.

Figure 5:
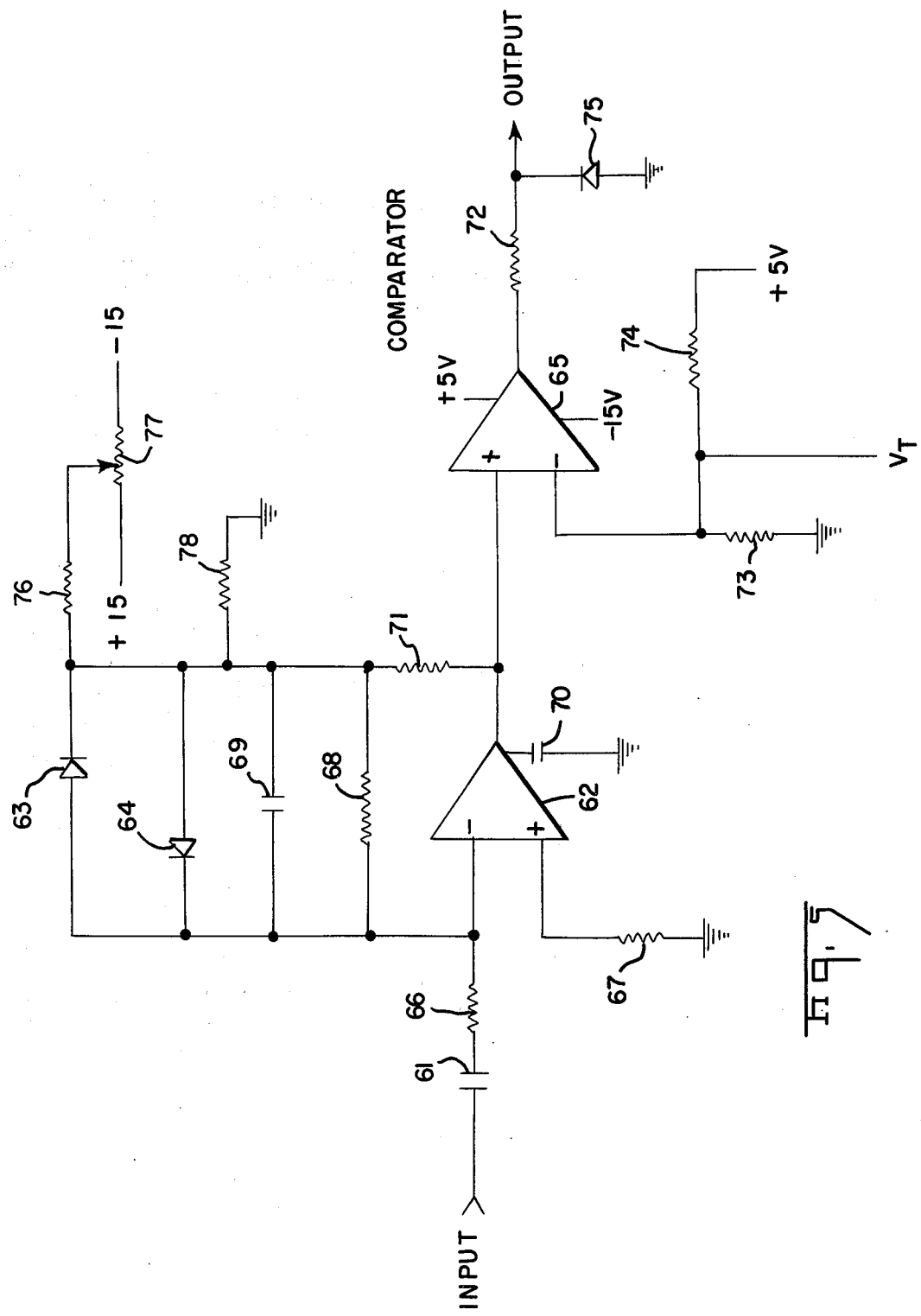
FIG. 5 shows the circuit of a logarithmic differentiator and comparator.

FIG. 5 shows typical circuitry for the logarithmic differentiator 51 and the comparator 52. The input signal is differentiated by the capacitor 61. Amplifier 62 and associated circuitry provide nonlinear processing, in this case logarithmic processing. Diodes 63 and 64 provide progressively higher feedback as the input signal increases to produce nonlinear scaling for large input signals. For small input signals, the scaling is linear. While a log of derivative circuit has been shown and described, it will be understood that other nonlinear signal processing circuits can be used. For example, a derivative of logarithm circuit can be used.

The output of the logarithmic amplifier is applied to the comparator which includes amplifier 65. The variable threshold voltage $V_T$ is applied to the other input to the comparator.

The following examples of component values are given by way of example only and are not limiting:

Capacitor 61: 0.22μf
Amplifier 62: LM308
Diodes 63 and 64: 1N4148
Amplifier 65: 741
Resistor 66: 68.1K
Resistors 67 and 68: 316K
Capacitor 69: 0.27μf
Capacitor 70: 100pf
Resistor 71: 10K
Resistors 72 and 73: 3.16K
Resistor 74: 215K
Diode 75: 1N4148
Resistor 76: 1M Resistor 77: 20K
Resistor 78: 1K While particular embodiments have been shown and described, modifications are within the true spirit and scope of the invention. The appended claims are, therefore, intended to cover all such modifications.

What is claimed is:

1. An analyzer for electrophoretic samples comprising:
    a source of analysis energy,
    a sample stage movable linearly with respect to said source of analysis energy to scan a sample across said source,
    a detector of analysis energy producing an output representing the optical characteristics across said sample including extremities in said characteristics,
    a nonlinear differentiator, the output of said detector being applied to said nonlinear differentiator to produce an output signal having a magnitude at said extremities which is substantially independent of the magnitude of the output of said detector, and
    pulse shaping circuitry, the output of said nonlinear differentiator being applied to said circuitry to produce an output marking said extremities in the output of said detector.

2. The analyzer recited in claim 1 wherein said nonlinear differentiator includes a logarithmic amplifier.

3. The analyzer recited in claim 1 further comprising:
    an integrator for integrating the output of said detector between extremities thereof, the output of said pulse shaping circuitry being applied to start and stop said integrator.

4. The analyzer recited in claim 1 wherein said pulse shaping circuitry includes:
    a threshold comparator, the output of said nonlinear differentiator being applied to said threshold comparator to produce a pulse when the output of said differentiator exceeds a threshold voltage, and
    a threshold control circuit responsive to the first occurring pulse for changing the threshold voltage applied to said comparator.

5. The analyzer recited in claim 4 wherein said pulse shaping circuitry further includes:
    a one shot multivibrator, the output of said threshold comparator being applied to said one-shot multivibrator to produce a pulse upon the occurrence of an extremity in the output of said detector, and
    a retriggerable multivibrator connected to be triggered by the output of said threshold comparator, the output of said retriggerable multivibrator being connected to inhibit said one shot multivibrator to suppress response thereof to closely occurring extremities.

6. The analyzer recited in claim 1 wherein said nonlinear differentiator produces logarithmic scaling of large input signals and linear scaling of smaller input signals.

* * * * *